A. B. SIMONDS.
CARBON PAPER.
No. 7,837. Reissued Aug. 7, 1877.
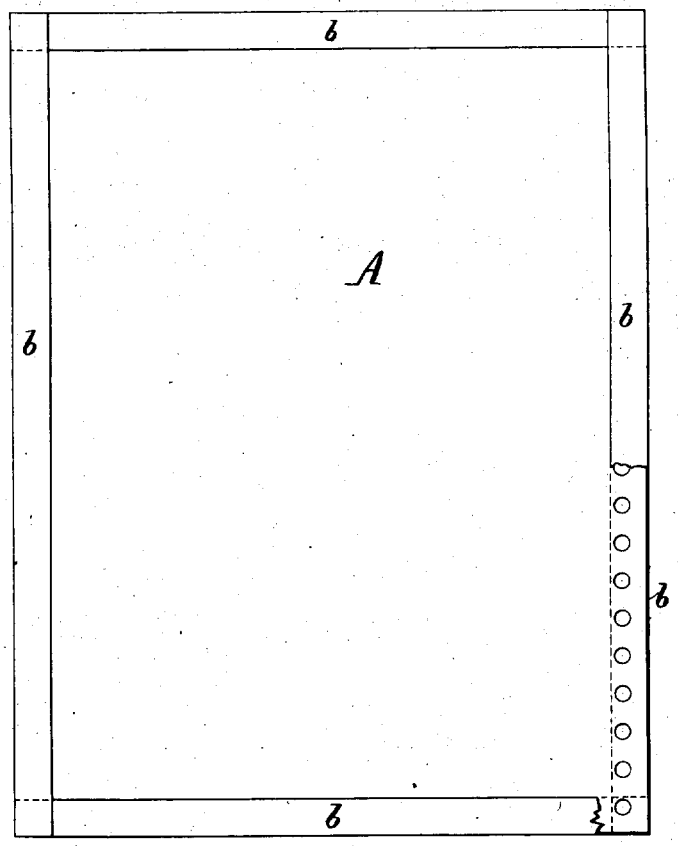
Witnesses:
C. C. Stetson
A. H. Quez Gentner
Inventor:
A. B. Simonds
by his attorney
Thomas D. Stetson
New York

UNITED STATES PATENT OFFICE.

ALONZO B. SIMONDS, OF NEW YORK, N. Y.

IMPROVEMENT IN CARBON PAPER.

Specification forming part of Letters Patent No. 167,361, dated August 31, 1875; Reissue No. 7,527, dated August 7, 1877; application filed July 18, 1877.

*To all whom it may concern:*

Be it known that I, ALONZO B. SIMONDS, of New York city, in the State of New York, have invented certain new and useful Improvements relating to Carbon Paper for Manifold Writing; and I do hereby declare that the following is a full and exact description thereof.

I designate as carbon paper the paper, whether adapted to produce black or other colored impressions, which is prepared with carbon or other material, so that on being laid between sheets of other paper and traversed over by a proper stylus, it will produce a corresponding impression on the paper above and below. It is important to preserve both surfaces of the carbon paper for active use.

It seems to be a necessary condition to the proper sensitiveness and usefulness of the paper that it shall be of a character to readily part with its coloring matter. This involves considerable inconvenience in the handling, particularly when the fingers are moistened with perspiration.

I have discovered, and practically applied, means of greatly facilitating convenience and neatness in the use of such paper without in any considerable degree interfering with its efficiency or seriously increasing its cost.

The accompanying drawing represents what I consider the best means of carrying out the invention.

A is a sheet of ordinary carbon paper. I punch, by machinery or otherwise, a series of holes, *a*, along its edges. I then apply thereon strips of thin, well-sized ordinary writing-paper *b*, folding it so that it shall cover the edge and extend inward upon both faces of the carbon paper to an extent a little beyond the holes *a*. I cement this paper *b* by means of silicate of soda applied in the manner of mucilage. The surfaces of the writing-paper *b* are presented directly together through the holes *a*. On those surfaces, therefore, the cementing material acts directly to unite the two surfaces of the paper *b* together. The silicate-of-soda solution forms a strong cementing material on those surfaces, and also acts with some effect on the oleaginous surface of the carbon paper A.

The sheets thus prepared may be handled by the edges with cleanliness and facility.

The paper *b* not only forms a clean surface by which to take hold of the carbon paper, but also stiffens it, so that it is much more easily placed in position and changed, as required. The thickness of the edging material *b* may be so little as to induce no difficulty in piling up the carbon paper, and the thin transparent paper on which the impressions are made to the ordinary number of thicknesses. Some writers can handle a stylus with such effect as to write plainly through from thirty to fifty sheets of paper. A greatly-increased thickness at the edges of the carbon paper would induce mischief when thus piled up.

I propose to use material other than common writing-paper for the edging material *b*. I can use various kinds of paper, or parchment, or even thin sheet-brass. I can secure the surfaces by various methods of puncturing, or by other cements than silicate of soda. Common mucilage will serve with some success. I esteem it practicable to stitch through a cemented material by hand or with a sewing-machine, so that the stitching and cementing may serve together to effect and preserve the union; but I have in my experiments succeeded the best with hard writing-paper and a tolerably thick solution of silicate of soda.

I claim as my invention—

Impression writing-sheets A, having a clean and stiffening covering material, *b*, upon one or more edges, adapted to serve as and for the purposes herein specified.

In testimony whereof I have hereunto set my hand this 14th day of July, 1877, in the presence of two subscribing witnesses.

A. B. SIMONDS.

Witnesses:
THOMAS L. STETSON,
CHAS. C. STETSON.